(12) United States Patent
Frey et al.

(10) Patent No.: US 6,793,143 B2
(45) Date of Patent: Sep. 21, 2004

(54) DATA CARRIER

(75) Inventors: Thomas Frey, Ebersberg (DE); Martin Merck, München (DE)

(73) Assignee: Giesecke & Devrient GmbH, München (DE)

( * ) Notice: Subject to any disclaimer, the term of this patent is extended or adjusted under 35 U.S.C. 154(b) by 0 days.

(21) Appl. No.: 10/406,315

(22) Filed: Jul. 24, 2003

(65) Prior Publication Data

US 2004/0011875 A1 Jan. 22, 2004

Related U.S. Application Data

(63) Continuation of application No. 09/622,930, filed as application No. PCT/EP99/01636 on Mar. 12, 1999, now abandoned.

(30) Foreign Application Priority Data

Mar. 12, 1998 (DE) .......................................... 198 10 675

(51) Int. Cl.⁷ .............................................. G06K 19/06
(52) U.S. Cl. ....................................................... 235/492
(58) Field of Search ................................. 235/492, 380, 235/382–383; 705/51; 380/239–241, 281

(56) References Cited

U.S. PATENT DOCUMENTS

| | | | |
|---|---|---|---|
| 4,761,737 A | | 8/1988 | Duvall et al. |
| 4,816,653 A | | 3/1989 | Anderl et al. |
| 4,816,654 A | * | 3/1989 | Anderl et al. ................ 235/380 |
| 4,882,474 A | * | 11/1989 | Anderl et al. ................ 235/380 |
| 5,771,386 A | * | 6/1998 | Baumbauer .................. 717/164 |
| 5,832,083 A | * | 11/1998 | Iwayama et al. ............. 705/51 |
| 2002/0055910 A1 | * | 5/2002 | Durbin ......................... 705/64 |
| 2003/0028686 A1 | * | 2/2003 | Schwabe et al. ............ 709/332 |

* cited by examiner

*Primary Examiner*—Thien M. Le
*Assistant Examiner*—Edwyn Labaze
(74) *Attorney, Agent, or Firm*—Bacon & Thomas, PLLC (57) ABSTRACT

A data carrier for interpreter-based execution of an application existing in the form of an application program resulting from an object-oriented source program includes a communication device (10), and a memory device (12) containing at least one application program and an interpreter unit (15). The application program is structured in class files (22) each containing a library section (25) whose entries (46) are formed by invariable elements of the interaction context and which is structured in a sequence of equally long segments (50) each comprising a predetermined number of bytes. A certain number of segments (5) forms an entry (46). The physical position of the first segment of each entry (46) within the byte sequence is used by the interpreter unit (15) as a reference for the entry (46).

8 Claims, 6 Drawing Sheets

DATA CARRIER

This is a continuation of U.S. Ser. No. 09/622,930 filed Jan. 18, 2001, abandoned, which is a 371 of PCT/EP99/01636 filed on Mar. 12, 1999.

BACKGROUND OF THE INVENTION

The invention relates to a data carrier having a processing device, a communication device for exchanging data with an external unit, and a memory device containing at least one application program. A known data carrier of this kind is the smart card, which is used in an increasing number of applications. This development is driven by the ever growing efficiency of the processor systems realizable in the chips. Whereas smart cards could hitherto only perform functions predefined by the card manufacturer, current chip architecture fundamentally permits a user to implement functions subsequently. However, permitting such user implementations involves the risk of reducing the functional safety of a smart card when the functions are implemented by means of runnable programs which the operating system of the card can directly execute. Such runnable programs directly access basic card functions, allowing manipulation or disturbance thereof. To overcome this difficulty it is recommendable to use operational concepts involving the storage of interaction files which are converted into executable statements by an interpreter unit. An especially current concept of this kind is known under the brand name JAVA and specified in the publications of "The JAVA Series," published by Addison/Wesley. JAVA contains an object-oriented programming language and a processor unit realized in software and called a virtual machine. The virtual machine is part of the processor unit for which an application program is intended. The program exists in a class file format into which the underlying JAVA program was converted by compilation. During execution of a program, the virtual machine performs numerous security tests. In addition it controls the intervention of program statements in the basic functions of the processor system. In this way once can prevent application programs from impairing the operations safety of the processor unit.

It has also been proposed to use the JAVA concept for smart cards. However, use in smart cards is limited by the comparatively great storage requirement for the interaction programs and the virtual machine, and the slow execution of the programs due to the object orientation.

SUMMARY OF THE INVENTION

The invention is based on the problem of stating a data carrier suitable for implementation of application programs by a user and having the same operational safety as the JAVA concept but managing with smaller programs and executing them faster.

This problem is solved by a data carrier having the features of the main claim. An inventive data carrier has the advantage that interaction contexts generated by a user require less storage space than customary programs based on class files as are provided in particular for virtual JAVA machines. Due to its pronounced structuring the interpreter unit can execute them much faster. These advantages are obtained by introducing a number-based referencing system to replace the textual referencing otherwise customary. The basis for this is the finding that the referencing space identifiable by numbers suffices for many purposes, in particular ones in conjunction with smart card applications. An inventive data carrier does not require fundamental reconstruction of an interpreter unit. Advantageously, the inventive interaction file structure instead allows all security tests known from JAVA to be adopted without restriction so as to absolutely ensure the operational safety of the data carrier with respect to its basic functions.

An especially advantageous development of the proposed data carrier provides for systematically giving the packets simplified identification in the form of a short identification number, recording the identification system in a table and using it within a packet for referencing the totality of packets.

Very advantageously, number designations are further also used for the methods and attributes occurring in a packet.

BRIEF DESCRIPTION OF THE DRAWINGS

An example of the invention will be explained in more detail in the following with reference to the drawing, in which.

DETAILED DESCRIPTION OF THE PREFERRED EMBODIMENTS

Figure 1:
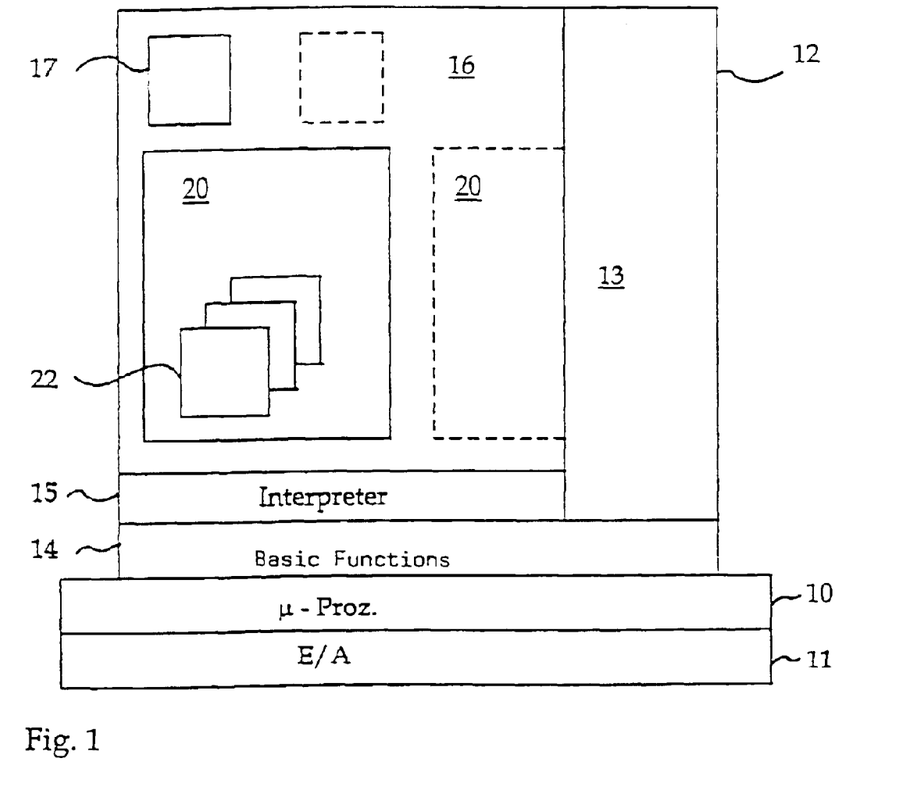
FIG. 1 shows a data carrier.

FIG. 1 shows the typical structure of a data carrier. Its essential parts are micro-processor 10 for processing and managing all signals handled in the data carrier, input output interface 11 for exchanging signals with an external device, and memory 12 containing the programs required for operation of the data carrier and the data to be processed and/or managed. Memory 12 is accordingly formally structured in a plurality of areas. A first area contains operating system 13 for controlling operation of microprocessor 10. Second area 14 contains basic functions residing permanently in the data carrier. These include for example the check of a PIN code if the data carrier is located e.g. on a personal smart card. Further memory area 15 contains an executive program forming the interpreter unit. Memory area 15 containing the interpreter unit is expediently not alterable by a user. It may also be provided that interpreter unit 15 is executed in hardware form. Further memory area 16 serves to receive application programs which the user can introduce into the data carrier in order to equip it with further functions.

The application programs are executed by interpreter unit 15 in reference-oriented fashion. They result by compilation of underlying application source programs preferably created in an object-oriented programming language. Following a basic concept of object-oriented programming, the application packets are structured in class files 22. Several class files 22 can be combined into one application packet 20, referred to as a packet in the following. All references within packet 20 are effected textually, no addresses being used. Packets 20 have associated therewith interaction contexts 17 which are created upon loading or installation of the programs in memory 12.

The proposed data carrier is conceived for applications with limited hardware resources, in particular for smart cards. It is equally suitable here for noncontact and contacting designs. In the former case input output interface 11 is formed e.g. as a coil, in the latter as a group of contact areas.

It is assumed for this description that the source programs underlying the application programs were written in JAVA and that the application packets resulting therefrom after compilation meet the semantic requirements for executability by a JAVA-capable virtual machine. Unless defined by the measures stated in the following description, interpreter unit 15 corresponds to the specification for a JAVA VIRTUAL MACHINE. The relation to the JAVA concept was selected because it is the most current object-oriented interpreter program system. However, the measures described in the following are not restricted to JAVA but can fundamentally also be transferred to related systems obeying the same basic principles.

Figure 2:
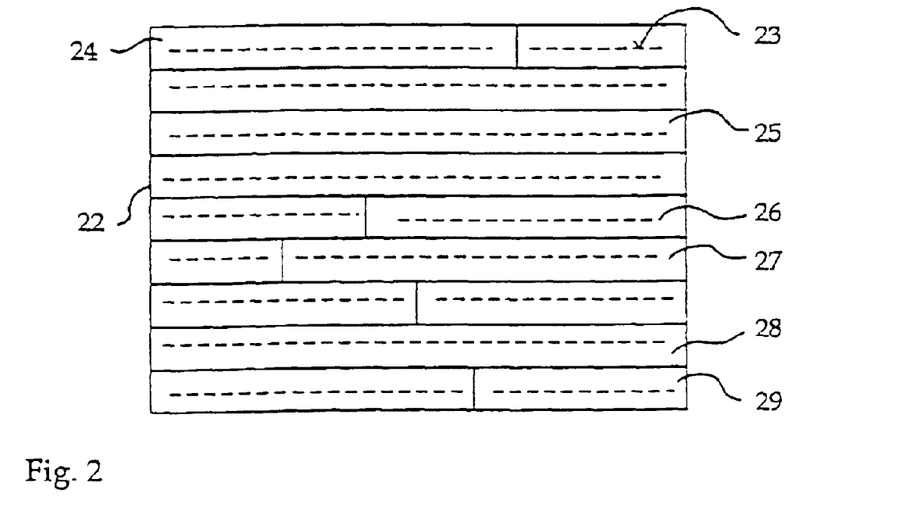
FIG. 2 shows a diagram of a class file.

FIG. 2 shows schematically the structure of class file 22 forming the basic structure of packet 20. In accordance with the basic semantics of the programming language concept, it consists of a sequence of 8-bit bytes which are indicated by horizontal lines 23. The byte sequence is organized in lined-up tables and contains all information and references necessary for interpreting class file 22. Each class file 22 can substantially be structured in six main sections: guide section 24 containing information on the class file as a whole, library section 25 in which invariable information required within the class file is entered, in particular the references used, interface section 26 with a list of interfaces contained in the class file, field section 27 with a list of data fields defined by the class, method section 28 with functions defined by the class, and attribute section 29 with additional information in particular on the fields and methods.

Figure 3:
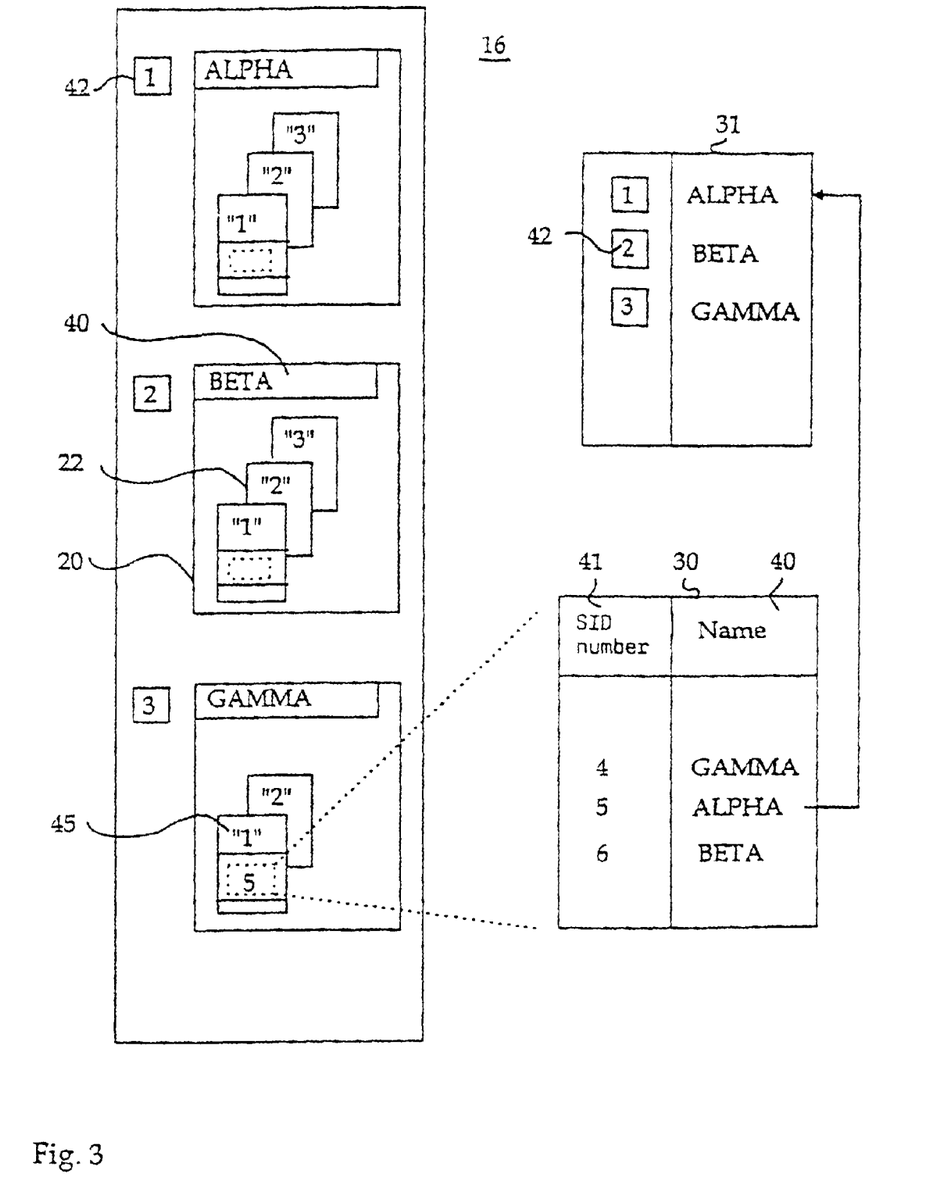
FIG. 3 shows the structure of an interaction file.

To increase the execution speed and reduce the storage requirement, packets 20 formed according to the invention have an especially suitable referencing system. FIG. 3 illustrates its structure. Packet 20 is formed by one or more class files 22. Each packet 20 has unique textual packet identification 40, preferably in the form of a textual name, and defined physical position 42 within memory 12, describable e.g. by a code number associated with the first packet bit. For each packet, short identification number 41 valid only within the packet is further created for execution by the interpreter unit. Creation is done dependently on runtime environment during loading of packet 20 into memory 12. The association of short identification numbers 41 with packet identifications 40 is kept in table 30 which is included in each class file 22 of packet 20 as an entry in library section 25. During loading of packet 20, interpreter unit 15 further notes in specially reserved database 31 actual physical position 42 of the packet in the memory as belongs to packet identification 40. During execution of a packet, interpreter unit 15 then uses short identification number 41 for referencing packet 20 by first determining the packet identification via table 30 and then branching to stated packet 20 via database 31.

Within packet 20, class files 22 are further designated by simple, consecutively numbering class identification number 45. This is used by interpreter unit 15 to reference class file 22 during execution of a packet. Thus, if e.g. a bytecode refers to class file 22 of another packet 20 by stating a short identification number and a class identification number, interpreter unit 15 first branches to packet 20 having the stated short identification number associated therewith, and looks there for the class file with stated class identification number 45.

The concept of using a simple, numbering-based identification system instead of textual referencings is also applied within class files 22. Therein the attributes and the stated methods are similarly designated by number names, and method identification numbers and attribute identification numbers created. The names preferably comprise two bytes each. One part, e.g. the first four bits, determine the access rights, the other bits form a number. Methods and attributes are referenced using the complete number names.

An especially suitable structure moreover realizes a simplified referencing of entries in library section 25. To illustrate the novel structuring, FIG. 4 first shows the structure of a library section as underlies a customary class file based on textual referencing. The library section is formed by a sequence of entries 46 which are shown one below the other in column form for clarity's sake. Each entry 46 comprises, beginning with tag 47, a byte count corresponding to its content. The count likewise precedes each entry in the form of byte 48. The resulting sequence of byte counts is used to define the position of each entry within the library section and to reference entries 46. Interpreter unit 15 expediently generates a table which states for each entry the position of its leading byte 47. Thus, in the simplified example of FIG. 4, byte position 7 is assigned e.g. to the second entry, byte position 12 to the third entry. If there is now a reference to the second library entry, e.g. from the fourth library entry, the interpreter unit branches to the byte at position 7 during execution with the aid of the table. Finding entries in the library section in this way is time-consuming if only because of the necessary determination of position.

Figure 4:
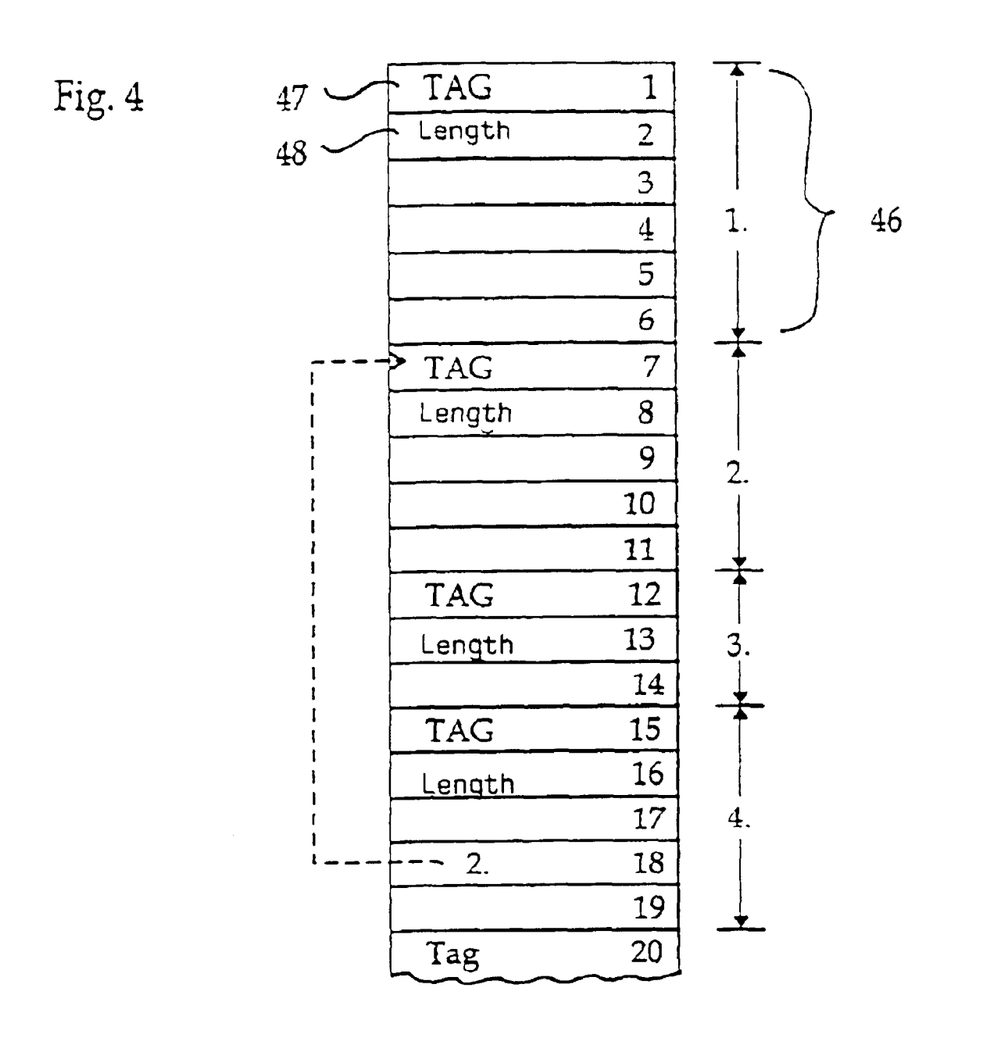
FIG. 4 shows the structure of the library section of a class file in the prior art.
Figure 5:
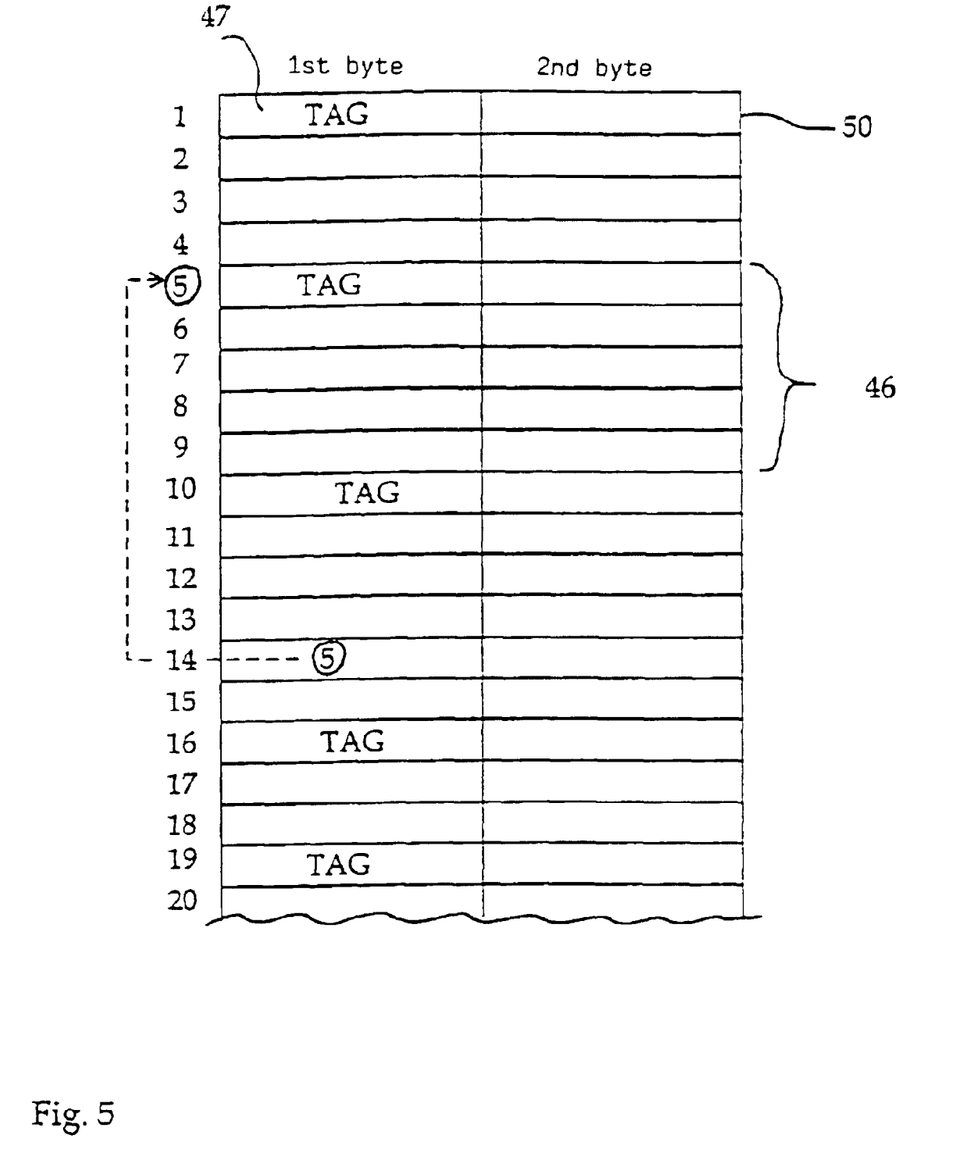
FIG. 5 shows the structure of a library section according to the invention.

FIG. 5 shows a detail of library section 25 structured according to the invention. The byte sequence forming library section 25 is now structured in two-byte segments 50. All entries 46 in library section 25 are aligned with this segment width. To illustrate the segmentation the library entries are rendered in the form of a bipartite column. Segments 50 are systematically identified. In simple fashion they are consecutively numbered for example, as indicated in FIG. 4. This identification system is then used to effect all references to entries in library section 25. For example, a reference is made to the entry beginning with segment 5 by stating the number 5. Apart from the modified referencing, library entries 46 usually have the same information content as entries in the "constant pool" of a JAVA class file have.

The referencing principle used in library section 25 is introduced consistently in all parts of class file 22 outside the library section. That is, all references to entries 46 in library section 25 are replaced by segment positions.

To further increase execution speed one can also add to a class file interpretive information containing the results of search and branching steps otherwise to be performed by the interpreter unit during execution of a class. It is useful to create a table stating for each method referenced in a class file where the method was overwritten, if applicable. Upon interpretation of an acquired method the interpreter unit then need not first test all sub- and superclasses for any overwriting. It is further expedient to create a list with the static variables used in a class. It is in addition useful to form a table recording the structure of the objects used in a packet. If such a table exists the interpreter unit can quickly localize acquired objects in the memory in physically correct fashion by simply evaluating the table. The proposed interpretive information forms a separate section in the class file appearing before or in the place of attribute section 29 normally not set up. Setting up interpretive information and thus allocating the specially provided section is optional.

Table 1 shows the total structure of class file 22 resulting from realization of the above-described measures, represented in a metalanguage borrowed from the programming language "C."

TABLE 1

```
Struct CCFF {
    unsigned int              magicNo;
    unsigned short            minorVersion;
    unsigned short            majorVersion;
    unsigned short            noCCPEntriess;
    unsigned short            arrayCCPEntries[noCCPEntries];
    unsigned short            noSPAIDTableElements;
    struct spaidTableElement  spaidTable[noSPAIDTableElements];
    unsigned short            accessFlags
    unsigned short            idxCCPSegThisClass;
    unsigned short            idxSegSuperClass;
    unsigned short            noCCPInterfaces;
    unsigned short            arrayInterfaces[noCCPInterfaces];
    unsigned short            noFieldInfo;
    struct fieldInfoElement   arrayFieldInfo[noFieldInfo];
    unsigned short            noMethodInfo;
    struct methodInfoElement  arrayMethodInfo[noMethodInfo];
    unsigned short            noRvtImageElements;
    struct rvImageElement     rvImage[noRvtImageElements];
    unsigned short            noSvImageElements;
    struct svImageElement     svImage[noSvImageElements];
    unsigned short            noOImageElements;
    struct oImageElement      oImage[noO]ImageElements];
}
```

The meanings of the stated file elements are shown in the following Table 2.

TABLE 2a magicNo

Size: 4 bytes
Use: Identifier of class file minorVersion

Size: 2 bytes
Use: Corresponding to JVM specification majorVersion

Size: 2 bytes
Use: Corresponding to JVM specification noCCPEntries

Size: 2 bytes
Use: Number of segments contained in library section 28 arrayCCPEntries

Size: Number of segments of entry noCCPEntries times segment size
Use: Library section 28 noSPAIDTableElements

Size: 2 bytes
Use: Number of elements in short identification number table, corresponding to number of short identification numbers used or packet identifications within class file spaidTable

Size: Number of entries in noSPAIDTableElements times size of single entries (16 bytes)
Use: Association of short identification number with packet identification number accessFlags

Size: 2 bytes
Use: Corresponding to JVM specification idxCCPSegThisClass

Size: 2 bytes
Use: Segment index for class entry in library section 28, corresponding to JVM specification (this_class)

TABLE 2a-continued idxCCPSegSuperClass

Size: 2 bytes
Use: Segment index for class entry in library section 28, analogous to JVM specification (super_class)

noCCPInterfaces

Size: 2 bytes
Use: Number of interface classes used in library section 28. Interfaces correspond to JVM specification

TABLE 2b arrayCCPInterfaces

Size: 2 bytes times number of interfaces in library section 28
Use: Segment index for class array designating interface in library section, corresponding to JVM specification (interfaces[ ])

noFieldInfo

Size: 2 bytes
Use: Number of FieldInfoElement entries, corresponding to JVM specification (fieldinfo)

arrayFieldInfo

Size: 6 bytes times number of FieldInfoElement entries
Use: Library section 28 noMethodInfo

Size: 2 bytes
Use: Number of methodinfoElement entries contained in library section 28 arrayMethodInfo

Size: n bytes times number of MethodInfoElement entries contained in library section 28
Use: Field with methodInfoElement rvImage

Size: 4 bytes times number of elements
Use: Optional. Contains information abstracted in short form on all virtual information to simplify setup of necessary link and runtime environment structures.

noRvImageElements

Size: 2 bytes
Use: Number of entries in rvImage, if 0 no rvImage.

noSvImageElements

Size: 2 bytes
Use: Number of entries in svImage; if 0 no svImage.

svImage

Size: 4 bytes times number of entries
Use: Optional. Contains information abstracted in short form on all virtual information to simplify setup of necessary link and runtime environment structures.

noOImage

Size: 2 bytes
Use: Number of entries in oImage; if 0 no oImage.

oImage

Size: 2 bytes times number of entries
Use: Optional object image. Contains information abstracted in short form on all virtual information to simplify setup of link and runtime environment structures.

Tables 3 to 8 below show the structural definitions of possible entries in library section 28, each with size, use and meaning of the elements stated in the tables, represented in a metalanguage borrowed from the programming language "C."

TABLE 3

```
struct CCPMethodref {
    const unsigned char   methodrefTag;
    unsigned char         padding;
    unsigned char         spaid;
    unsigned char         cno;
    unsigned short        mno;
    unsigned short        idxCCPType
}
```

| | |
|---|---|
| Size: | 4 segments |
| Use: | Corresponding to JVM specification |
| methodrefTag: | 10, corresponding to JVM specification |
| padding: | Fill element |
| spaid: | Short identification number 41 of packet of class of referenced method |
| cno: | Short identification number 45 of class of referenced method |
| mno: | Method number of referenced method |
| idxCCPType | Segment index for a CCPType in library section |

TABLE 4

```
struct CCPClass {
    const unsigned char   classTag;
    unsigned char         padding
    unsigned char         spaid;
    unsigned char         cno;
}
```

| | |
|---|---|
| Size: | 2 segments |
| Use: | Corresponding to JVM specification |
| classTag: | 7, corresponding to JVM specification |
| padding: | Fill element |
| spaid. | Short identification number 41 of referenced packet |
| cno: | Short identification number 45 of referenced class |

TABLE 5

```
struct = CCPInterface Methodref {
    const unsigned char   interfaceMethodrefTag;
```

TABLE 5-continued

```
    unsigned char         padding;
    unsigned char         spaid;
    unsigned char         cno;
    unsigned short        mno;
    unsigned short        idxCCPType
}
```

| | |
|---|---|
| Size: | 4 segments |
| Use: | Corresponding to JVM specification |
| methodrefTag: | 11, corresponding to JVM specification |
| padding: | Fill element |
| spaid: | Short identification number of packet of class of referenced interface method |
| cno: | Number of class of referenced interface method |
| mno: | Number of referenced interface method |
| idxNCPType | Segment index for ncp type in NCP |

TABLE 6

```
struct CCPFieldref {
    const unsigned char   fieldrefTag;
    unsigned char         padding;
    unsigned char         spaid;
    unsigned char         cno;
    unsigned short        ano;
    unsigned short        idxCCPType
}
```

| | |
|---|---|
| Size: | 4 segments |
| Use: | Corresponding to JVM specification |
| fieldrefTag: | 9 |
| padding: | Fill element |
| spaid: | Short identification number 41 of packet with class of referenced attribute |
| cno: | Short identification number of class of referenced attribute |
| ano. | Number of referenced attribute |
| idxNCPType | Segment index for ncp type in library section 28 |

TABLE 7

```
struct CCPType {
    const unsigned char   typeTag;
    unsigned char         padding;
    unsigned short        noNibbles;
    unsigned char         typeDesc[(noNibbles+1)/2];
}
```

| | |
|---|---|
| Size: | n segments |
| Use: | Corresponding to JVM specification |
| typeTag:: | 1 |
| padding: | Fill element |
| noNibbles: | Number of allocated 4-bit nibbles in typeDesc field |
| typeDesc: | Field of 4-bit nibbles with size (noNibbles+1)/2 |
| Values for typeDesc: | enum { void = 0x1, byte = 0x2, char = 0x3, double = 0x4, float = 0x5, int = 0x6, Long = 0x7, short = 0x8, boolean = 0x9, field = 0xA, instance = 0xB } |

TABLE 8

```
struct CCPInteger {
    const unsigned  integerTag;
    unsigned char   padding;
    integer         value;
}
    Size:  3 segments
    Use:   Corresponding to JVM specification
```

Figure 6:
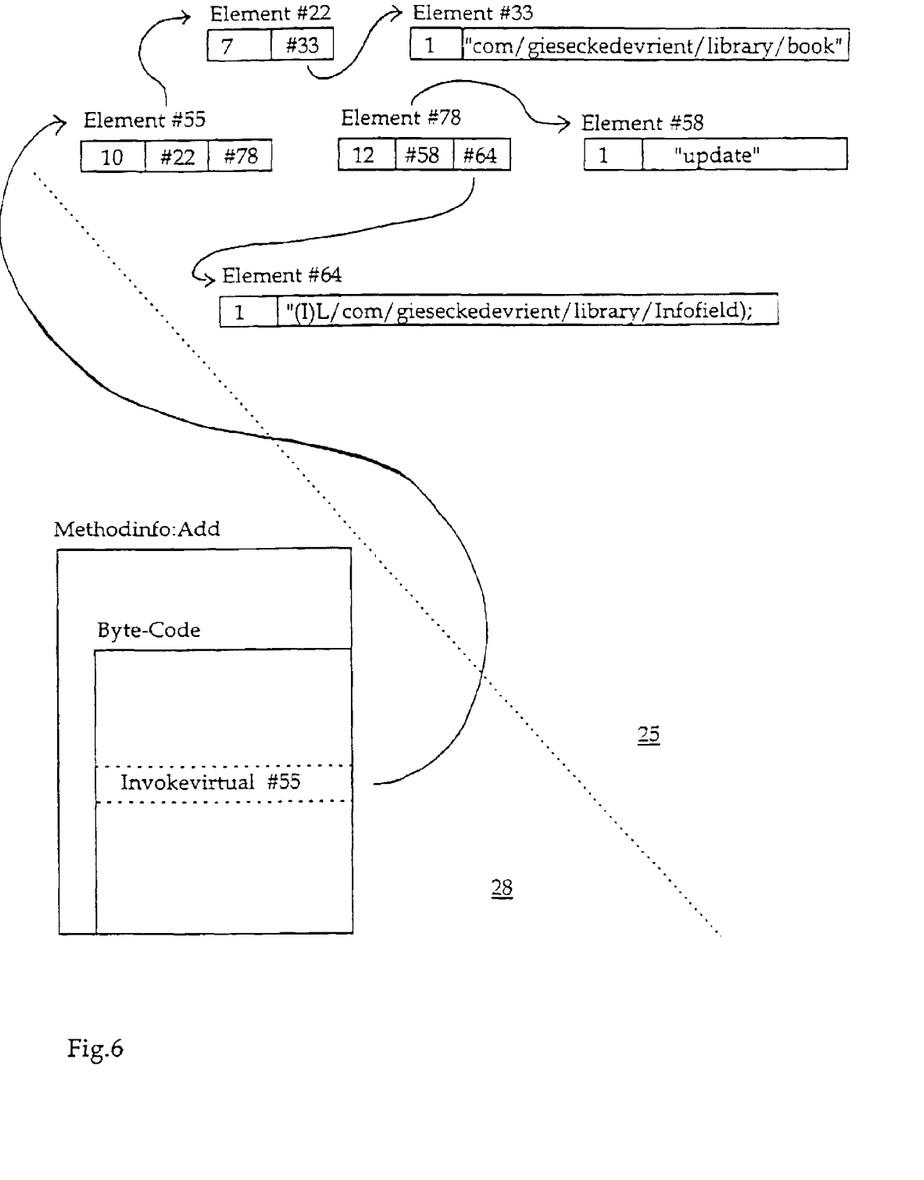
FIG. 6 shows the execution of the class file resulting from the source program by an interpreter unit in the prior art.
Figure 7:
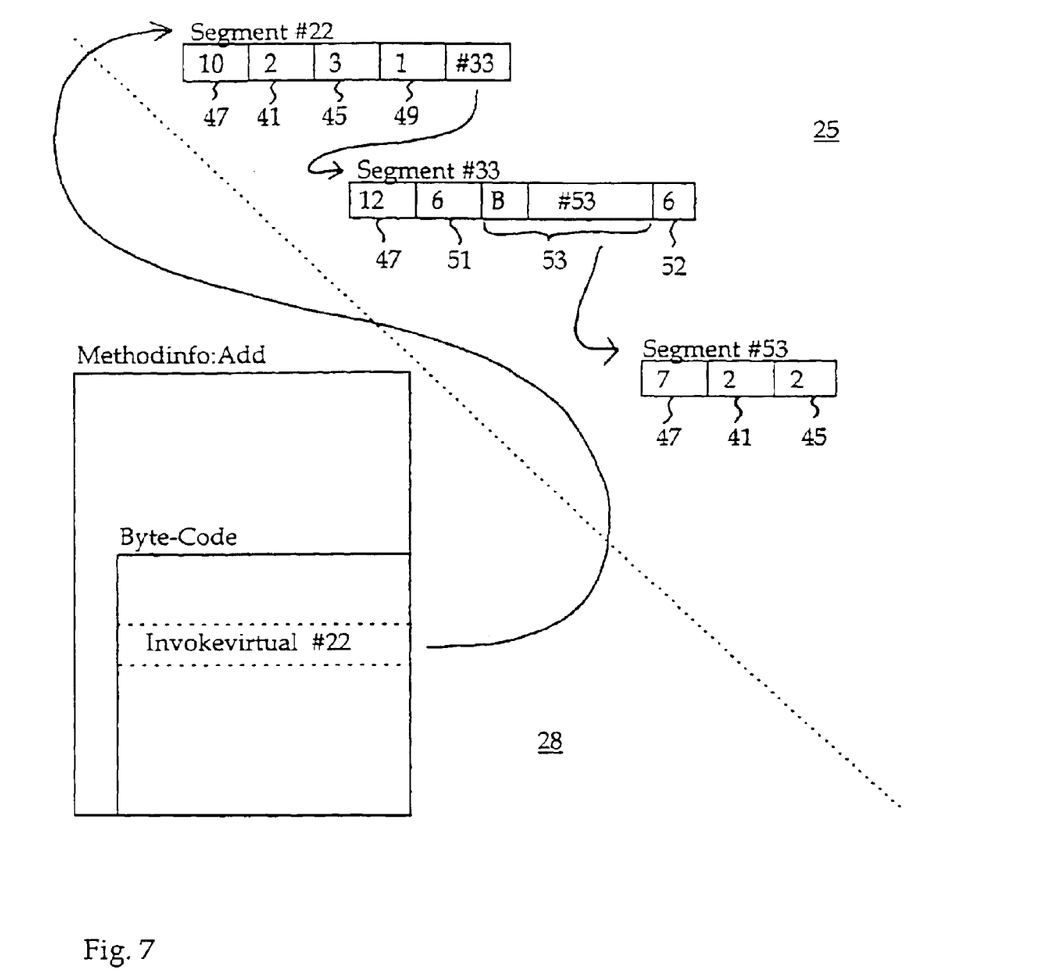
FIG. 7 shows the same execution according to the invention.

The simplified executability of a packet by interpreter unit 15 resulting from the proposed referencing system is illustrated by an example in FIGS. 6 and 7. The example is based on the source program sequence written in JAVA and shown in Table 9, which describes an addition and accordingly contains a method "Add."

TABLE 9

```
import com.gieseckedevrient.library.InfoField
import com.gieseckedevrient.library.Book
class Purse extends Object {
    private int my Value;
    private class Book myBook;
    public InfoField Add (int increment)
    {
        my Value +=increment;
        return myBook.Update(myValue);
    }
}
```

In customary execution of the resulting class file shown in FIG. 6, interpreter unit 15 branches to method section 28 of class file "Purse" to the entry of the method "Add". The corresponding bytecode contains the statement "invokevirtual" specifying an element of library section 25, namely element #55. Interpreter unit 15 thus branches thereto. Element #55 in turn contains two branch instructions referring to further elements #22 and #78 of library section 25. Element #22 refers in turn to element #33 which finally contains information in textual form on the class "Book" stated in the source program sequence. The first text blocks designate a packet, the last one—"Book"—the class. Second element #78 commanded by element #55 in turn contains two rereferencings, one to element #58 and one to element #64. The first contains in textual form the method "update" to be executed. Element #64 contains, likewise in textual form, information on the return parameter, here of the "InfoField" type, and specifies the type of transfer parameter. The first text blocks designate again a packet, the letter "I" in brackets designates the type of transfer parameter, here integer. The following text blocks designate the return type as an instance of the class "InfoField" defined in the packet "com/gieseckedevrient/library."

The execution of the same source program sequence starting from a class file with an inventive, above-described structure is illustrated in FIG. 7. Again, the interpreter unit first branches to method section 28 to the statement "invokevirtual." The latter refers to segment #22 in library section 25. This contains tag number 47 indicating a method, short identification number 41 of the packet belonging to the desired method, class number 45 containing the method, and method number 49. In addition, segment #22 refers to segment #33. The latter in turn contains tag number 47 indicating the description of a parameter type, information 51 on a number of nibbles following for describing the type of return parameter, followed by the corresponding number of nibbles for describing the return parameter, and information 52 on the type of transfer parameter. The description of return parameter 53 contains a reference to segment #53 of library section 25. Segment #53 in turn contains not only tag number 47 indicating a class but also short identification number 41 of a packet and class number 45 identifying the type of return parameter. These statements completely describe the program sequence. Thus, in the example three branchings replace six using textual referencings. The smaller number of single statements due to the use of the number-based referencing system reduces the storage requirement for the underlying class files.

The described concept offers wide latitude for design with respect to its single measures. Thus, the proposed structuring of the library section in two-byte segments has proved advantageous in practice because this permits optimum utilization of storage space. However, one can basically use any other segment width as well. Instead of numbers one can of course use another simple identification system. In particular, it might be expedient in certain cases to realize only some of the single measures, for example segment the library section but not introduce short identification numbers.

What is claimed is:

1. A data carrier having a processor device (10), a communication device (11) for exchanging data with an external unit, and a memory device (12) containing at least one application program and an interpreter unit (15) for reference-oriented execution of the application program, wherein the application program is structured in class files (22) each having a library section (25) whose entries (46) contain invariable elements of the interaction context required during execution of the code forming the class file (22),
    wherein the library section (25) of each class file (22) of said application program is structured in a sequence of equally long segments (50) each comprising a predetermined number of bytes, wherein each entry (46) in the library section (25) comprises a given number of segments (5),
    wherein each entry includes a first segment having a position defined by a number of segments that precedes the entry in said sequence, and
    wherein the position of the first segment of each entry (46) within the byte sequence serves as a reference for the entry.

2. The data carrier according to claim 1, characterized in that the class files (22) of an application program are combined into packets (20).

3. The data carrier according to claim 2, characterized in that the packets (20) have associated therewith short identification numbers (41) serving to reference a packet (20).

4. The data carrier according to claim 3, characterized in that the library section (25) of each class of a packet (20) contains a table (30) in which all short identification numbers (41) allocated in the packet (20) are entered.

5. The data carrier according to claim 1, characterized in that the class files (22) are designated by a number (45), and the interpreter unit (15) utilizes the number (45) for finding the class files (22) during execution of an application program.

6. The data carrier according to claim 1, characterized in that the methods contained in an application program are designated by a number, and the numbers are used for finding the method within the application program.

7. The data carrier according to claim 1, characterized in that the attributes contained in an application program are numbered, and the numbers are used for finding the attributes.

8. The data carrier according to claim 1, characterized in that a class file (22) has a section holding information containing a result of a search or branding otherwise to be performed by the interpreter unit (15) during interpretation of a statement.

* * * * *